(12) United States Patent
Yamada et al.

(10) Patent No.: US 10,069,990 B2
(45) Date of Patent: Sep. 4, 2018

(54) IMAGE PROCESSING APPARATUS, METHOD OF CONTROLLING THE SAME, AND RECORDING MEDIUM FOR SELECTIVELY PROCESSING PACKETS USING A PROCESSOR OR A SUB PROCESSOR

(71) Applicant: Konica Minolta, Inc., Chiyoda-ku, Tokyo (JP)

(72) Inventors: Masami Yamada, Osaka (JP); Katsuhiko Akita, Amagasaki (JP); Kaitaku Ozawa, Nishinomiya (JP); Yuji Okamoto, Nishinomiya (JP); Yuki Asai, Itami (JP); Kenichi Takahashi, Osaka (JP); Yasutaka Ito, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/447,380

(22) Filed: Mar. 2, 2017

(65) Prior Publication Data
US 2017/0257504 A1      Sep. 7, 2017

(30) Foreign Application Priority Data
Mar. 7, 2016   (JP) .................................. 2016-043289

(51) Int. Cl.
*G06K 15/00*      (2006.01)
*H04N 1/00*       (2006.01)
*H04W 84/12*      (2009.01)

(52) U.S. Cl.
CPC . *H04N 1/00891* (2013.01); *H04N 2201/0039* (2013.01); *H04N 2201/0094* (2013.01); *H04W 84/12* (2013.01)

(58) Field of Classification Search
None
See application file for complete search history.

(56) References Cited

U.S. PATENT DOCUMENTS

| 2011/0153815 A1* | 6/2011 | Aoki | H04L 29/12264 |
| | | | 709/224 |
| 2012/0057196 A1* | 3/2012 | Kamei | G06F 3/1221 |
| | | | 358/1.15 |

(Continued)

FOREIGN PATENT DOCUMENTS

| JP | 2014-197333 A | 10/2014 |
| JP | 2014-203093 A | 10/2014 |

*Primary Examiner* — Henok A Shiferaw
(74) *Attorney, Agent, or Firm* — Buchanan Ingersoll & Rooney PC (57) ABSTRACT

An image processing apparatus includes a main processor configured to process packets received by a wired LAN module and a wireless LAN module in a normal state and a sub processor configured to process packets received by the wired LAN module and the wireless LAN module in place of the main processor in a first power saving state in which supply of electric power to the main processor is stopped. In the first power saving state, the sub processor is configured to process a packet received by the wired LAN module by using a first combination of a MAC address and an IP address and to process a packet received by the wireless LAN module by using a second combination of a MAC address and an IP address.

12 Claims, 4 Drawing Sheets

(56) References Cited

U.S. PATENT DOCUMENTS

| | | | | |
|---|---|---|---|---|
| 2012/0239953 A1* | 9/2012 | Kuroko | ............. | G06K 15/4055 |
| | | | | 713/320 |
| 2013/0159743 A1* | 6/2013 | Inoue | ................ | H04N 1/00896 |
| | | | | 713/320 |
| 2014/0164807 A1* | 6/2014 | Okazawa | ............. | G06F 1/3209 |
| | | | | 713/323 |
| 2014/0298054 A1* | 10/2014 | Hasui | ................... | G06F 1/3243 |
| | | | | 713/320 |
| 2015/0181057 A1* | 6/2015 | Mutsuno | ........... | H04N 1/00344 |
| | | | | 358/1.14 |
| 2016/0212289 A1* | 7/2016 | Tomi | ................ | H04N 1/00896 |

\* cited by examiner

IMAGE PROCESSING APPARATUS, METHOD OF CONTROLLING THE SAME, AND RECORDING MEDIUM FOR SELECTIVELY PROCESSING PACKETS USING A PROCESSOR OR A SUB PROCESSOR

This application is based on Japanese Patent Application No. 2016-043289 filed with the Japan Patent Office on Mar. 7, 2016, the entire content of which is hereby incorporated by reference.

BACKGROUND OF THE INVENTION

Field of the Invention

The present disclosure relates to an image processing apparatus, a method of controlling the same, and a recording medium, and particularly to an image processing apparatus having a proxy response function and a method of controlling the same as well as a recording medium storing a program executed in such an image processing apparatus.

Description of the Related Art

Various techniques relating to a power saving state of an image processing apparatus such as a multi-functional peripheral (MFP) have conventionally been proposed.

For example, Japanese Laid-Open Patent Publication No. 2014-303093 discloses a printer including a network controller connected to a wired local area network (LAN) and communication means lower in power consumption than the network controller. The printer is connected to the LAN through the communication means in a power saving mode and is connected to the LAN by means of the network controller when it receives a recovery notification.

Japanese Laid-Open Patent Publication No. 2014-197333 discloses an MFP to which proxy response is provided by an access point of a wireless LAN. A packet pattern file for response in a power saving state is stored in a random access memory (RAM) of the MFP. The MFP deletes from the packet pattern file, a packet pattern corresponding to a type to which proxy response can be provided by an access point. Thus, another packet pattern can be stored in the packet pattern file instead of the deleted packet pattern.

A wired LAN and a wireless LAN use protocols different from each other. Therefore, a conventional image processing apparatus connected to both of the wired LAN and the wireless LAN includes a processor for the wired LAN and a processor for the wireless LAN as processors for proxy response. Therefore, the image processing apparatus has had to feed electric power to two processors in a power saving state.

SUMMARY OF THE INVENTION

Under the circumstances, a technique for reducing power consumption in a power saving state in an image processing apparatus is required.

According to one aspect of the present disclosure, an image processing apparatus is provided. The image processing apparatus includes a wired local area network (LAN) module configured to be connected to a wired LAN by using a first combination of a media access control (MAC) address and an Internet protocol (IP) address, a wireless LAN module configured to be connected to a wireless LAN by using a second combination of a MAC address and an IP address, a main processor configured to process packets received by the wired LAN module the wireless LAN module in a normal state of the image processing apparatus, and a sub processor configured to process packets received by the wired LAN module and the wireless LAN module in place of the main processor in a first power saving state of the image processing apparatus in which supply of electric power to the main processor is stopped. In the first power saving state, the sub processor is configured to process the packet received by the wired LAN module by using the first combination and to process the packet received by the wireless LAN module by using the second combination.

The sub processor may be configured to process, when the wired LAN module receives a packer simultaneously with reception of a packet by the wireless LAN module, the packet smaller is number of remaining opportunities for resending included in the packet.

The sub processor may be confirmed to process, when the wired LAN module receives a packet simultaneously with reception of a packet by the wireless LAN module and when the packet received by the wired LAN module and the packet received by the wireless LAN module are equal to each other in remaining number of opportunities for resending, the packet shorter m remaining time period still discarding of the packet.

The sub processor may be configured to have the image processing apparatus make transition from the first power saving state to a second power saving state by stopping supply of electric power to the sub processor. The wireless LAN module stay include a module processor and a memory. The memory may store a first program and a second program executed by the module processor. The module processor may be configured to allow, when a packet of a first type is received by the wireless LAN, passage of the packet of the first type to the sub processor by executing the first program in the first power saving state, and to provide in the second power saving state, when a packet of a second type is received by the wireless LAN, a response corresponding to the second type by executing the second program and perform processing for resuming supply of electric power to the sub processor when a packet of a third type is received by the wireless LAN by executing the second program.

The image processing apparatus may further include a controller configured to control data transmission between the wireless LAN module and the sub processor. The sub processor may have the controller make transition to a suspended state when the wired LAN module and the wireless LAN module have not received a packet continuously for a predetermined time period in the first power saving state or after the packet received by the wired LAN module or the wireless LAN module is processed in the first power saving state. The wireless LAN module may be configured to perform processing for canceling the suspended state of the controller when the wireless LAN module receives the packet of the third type while the controller is in the suspended state.

The controller may be a universal serial bus (USB) controller.

The controller may be a peripheral component interconnect express (PCIe) controller.

According to another aspect of the present disclosure, a method of controlling an image processing apparatus is provided. The image processing apparatus includes a main processor, a sub processor, a wired LAN module, and a wireless LAN module. The method includes the sub processor processing a packet received by the wired LAN module by using a first combination of a MAC address and an IP address in a power saving state in which supply of electric power to the main processor is stopped and the sub processor processing a packet received by the wireless LAN module by using a second combination of a MAC address and an IP address in the power saving state.

According to yet another aspect of the present disclosure, a non-transitory recording medium storing a computer readable program for controlling an image processing apparatus is provided. The image processing apparatus includes a main processor, a sub processor, a wired LAN module, and a wireless LAN module. The program causes the sub processor to perform processing a packet received by the wired LAN module by using a first combination of a MAC address and an IP address in a power saving state in which supply of electric power to the main processor is stopped and processing a packet received by the wireless LAN module by using a second combination of a MAC address and an IP address in the power saving state.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OP THE PREFERRED EMBODIMENTS

Hereinafter, an embodiment of the present invention will be described with reference to the drawings, however, the scope of the invention is not limited to the illustrated examples.

In the description below, the same elements and components have the same reference characters allotted. Their labels and functions are also identical. Therefore, description thereof will not be repeated.

[1. Appearance of Image Processing Apparatus]

Figure 1:
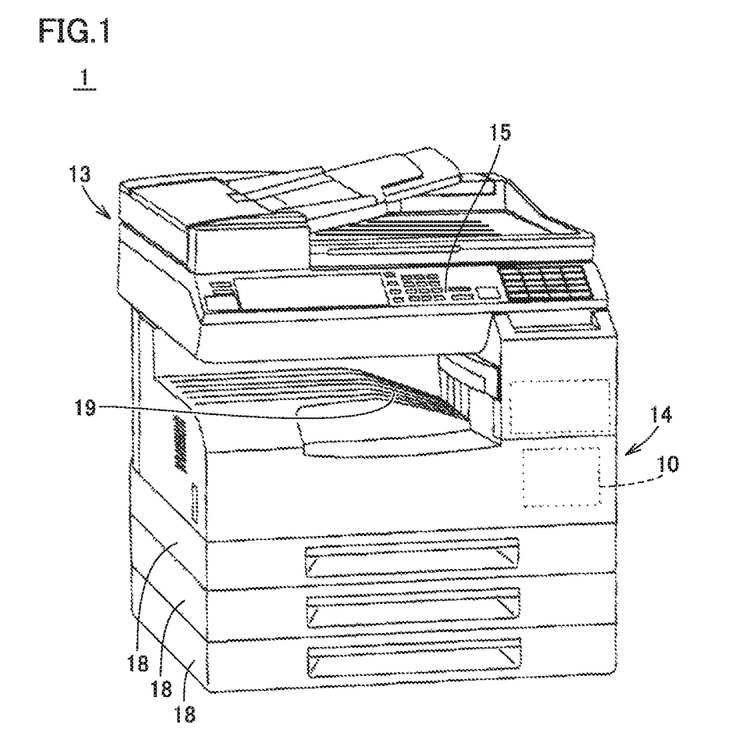
FIG. 1 is a diagram showing appearance of an MFP in one embodiment of an image processing apparatus.

FIG. 1 is a diagram showing appearance of an MFP 1 in one embodiment of an image processing apparatus.

Referring to FIG. 1, MFP 1 includes an operation panel 15. Operation panel 15 includes, for example, a touch panel and an operation button and accepts input of an operation instruction and a character/a number to MFP 1.

MFP 1 further includes a scanner unit 13 and a printer unit 14. Scanner unit 13 obtains image data by optically reading a document. Printer unit 14 forms an image on a recording medium such as copy paper based on image data obtained by scanner unit 13 and image data transmitted from an external device.

MFP 1 further includes a paper feed unit 18 storing recording media supplied to printer unit 14 and a tray 19 on which recording media having an image formed by printer unit 14 are ejected.

In MFP 1, scanner unit 13 and printer unit 14 implement an image processing portion which performs an image processing operation. MFP 1 further includes a control box 10 accommodating hardware (for example, a control circuit substrate) for controlling scanner unit 13 and printer unit 14.

[2. Block Configuration]

Figure 2:
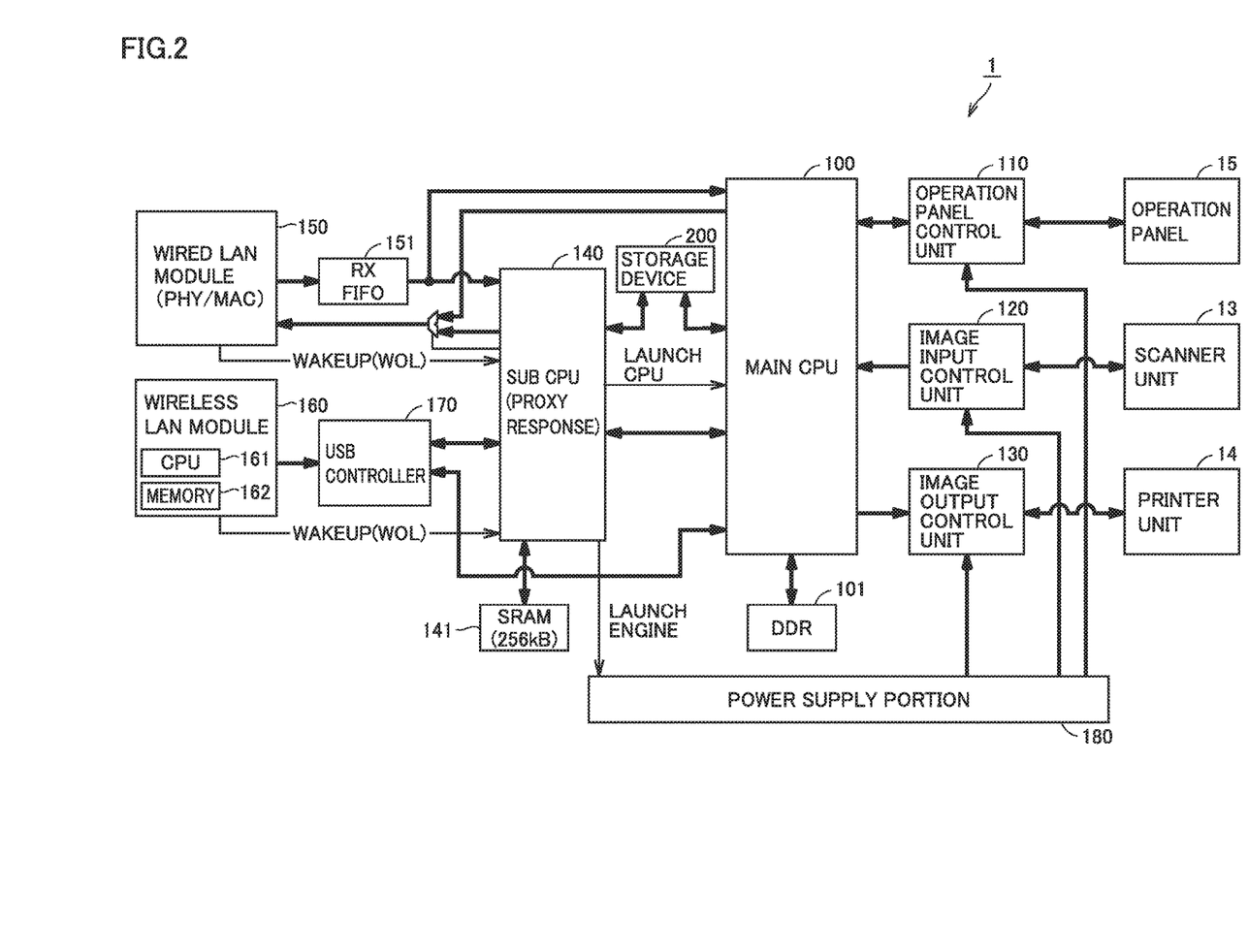
FIG. 2 is a diagram schematically showing one example of a hardware configuration of the MFP.

FIG. 2 is a diagram schematically showing one example of a hardware configuration of MFP 1.

As shown in FIG. 2, MFP 1 includes a main central processing unit (CPU) 100, a double-data-rate_synchronous dynamic random access memory (DDR_SDRAM) 101, an operation panel control unit 110, an image input control unit 120, an image output control unit 130, and a storage device 200. Main CPU 100 represents one example of a main processor.

Storage device 200 stores a program and data in a non-volatile manner. Main CPU 100 is configured to control overall operations of MFP 1 by executing a program stored in storage device 200. DDR_SDRAM 101 functions as a working area of main CPU 100.

Operation panel control unit 110 controls operation panel 15 in accordance with an instruction from main CPU 100. Operation panel control unit 110 outputs an input onto operation panel 15 to main CPU 100.

Image input control unit 120 controls scanner unit 13 in accordance with an instruction from main CPU 100. Image input control unit 120 outputs an image of a document generated by scanner unit 13 to main CPU 100.

Image output control unit 130 controls printer unit 14 in accordance with an instruction from main CPU 100. Image output control unit 130 detects an error caused in printer unit 14 and outputs occurrence of such an error to main CPU 100. When an error occurs in printer unit 14, main CPU 100 instructs operation panel 15 to provide a representation relating to the error.

MFP 1 further includes a sub CPU 140, a static RAM (SRAM) 141, a wired LAN module 150, a first in, first out (FIFO) buffer 151, and a wireless LAN module 160. Sub CPU 140 represents one example of a sub processor. SRAM 141 functions as a working area of sub CPU 140.

Sub CPU 140 is configured to perform various types of processing including prosy response by executing a program stored in storage device 200.

Wired LAN module 150 is implemented, for example, by a network card. A packet received by wired LAN module 150 is accumulated in FIFO buffer 151. Main CPU 100 and sub CPU 140 read a packet under the FIFO from FIFO buffer 151.

Wireless LAN module 160 is implemented, for example, by a universal serial bus (USB) wireless LAN adapter. MFP 1 further includes a USB controller 170 connected to wireless LAN module 160 and sub CPU 140. USB controller 170 controls transmission and reception of data between wireless LAN module 160 and sub CPU 140.

MFP 1 further includes a power supply portion 180 supplying electric power to each element in MFP 1.

An operating state of MFP 1 includes a normal state in which electric power is supplied to main CPU 100, a first power saving state in which electric power to the main CPU is stopped and electric power is supplied to sub CPU 140, and a second power saving state in which supply of electric power to the main CPU and sub CPU 140 is stopped.

In the normal state, main CPU 100 controls MFP 1 in accordance with information input to operation panel 15, information received by wired LAN module 150, or information received by wireless LAN module 160. In the normal state, main CPU 100 may also control MFP 1 in accordance with a result of execution of a given program by main CPU 100. When a given condition (for example, operation panel 15 being not operated for a certain time period or longer) is satisfied, main CPU 100 performs processing for having MFP 1 make transition to the first power saving state. The processing includes a launch instruction to sub CPU 140 and stop of supply of electric power to main CPU 100.

In the first power saving state, sub CPU 140 gives proxy response. Sub CPU 140 processes a packet input from wired LAN module 150 and a packet input from wireless LAN module 160 in place of the main CPU.

More specifically, sub CPU 140 launches main CPU 100 when a packet received by wired LAN module 150 or wireless LAN module 160 is a packet including a set of an IP address and a MAC address for launching main CPU 100. When a packet received by wired LAN module 150 or wireless LAN module 160 is consistent with a broadcast address or a multicast address for proxy response, sub CPU 140 gives proxy response. Proxy response includes address resolution protocol (ARP) response adapted to reception of a packet having a broadcast address and an ECHO response adapted to reception of a packet having a multicast address.

Wired LAN module 150 and wireless LAN module 160 are different from each other in MAC address and IP address to be used. Thus, with a program executed by sub CPU 140, a packet of which passage to sub CPU 140 is allowed by wireless LAN module 150 and a packet of which passage to sub CPU 140 is allowed by wireless LAN module 160 are different from each other in combination of a MAC address and an IP address. Thus, with the program executed by sub CPU 140, a combination of two addresses used at the time when a packet received by wired LAN module 150 is processed is different front a combination used at the time when a packet received by wireless LAN module 160 is processed. Thus, sub CPU 140 can process both of a packet input from wired LAN module 150 and a packet input from wireless LAN module 160.

Sub CPU 140 transmits and receives data to and from wireless LAN module 160 by means of USB controller 170. In the normal state, a host of USB controller 170 is main CPU 100. In the first power saving state, a host of USB controller 170 is sub CPU 140. In the normal state, a host of USB controller 170 may be sub CPU 140 and USB controller 170 and main CPU 100 may be connected to each other through an internal bus of sub CPU 140.

In the first power saving state, when a state that wired LAN module 150 and wireless LAN module 160 have not received a packet continues for a predetermined period or when processing of a packet received by wired LAN module 150 or wireless LAN module 160 is completed, sub CPU 140 notifies wired LAN module 150 and wireless LAN module 160 of transition of an operating state of MFP 1 to the second power saving state and thereafter stops supply of electric power to sub CPU 140.

In the second power saving state, wired LAN module 150 performs processing in accordance with contents of a received packet and wireless LAN module 160 performs processing in accordance with contents of a received packet. In the second power saving state, supply of electric power to USB controller 170 is also stopped. Thus, USB controller 170 makes transition to a suspended state. ARP response represents one example of processing in accordance with contents of a received packet. Response to ECHO represents another example.

For example, when wired LAN module 150 receives what is called a magic packet in the second power saving state, it launches sub CPU 140 by transmitting a signal to a general purpose I/O (GPIO) of sub CPU 140 by using a wake on LAN (WoL) function. The magic packet is a packet, for example, having a data pattern in which a MAC address of an apparatus to be launched is repeated 16 times after "FF:FF:FF:FF:FF:FF".

As shown in FIG. 2, wifeless LAN module 160 includes a CPU 161 and a memory 162 storing a program executed by CPU 161. CPU 161 in represents one example of a module processor.

In the fast power saving state CPU 161 determines whether or not an IP address and a MAC address of a packet received by wireless LAN module 160 have been stored in advance in memory 162 as indicating that the packet be sent to sub CPU 140. An address indicating that a packet be sent to sub CPU 140 is, for example, an address for ARP response, an address for ECHO response, or an address for launching main CPU 100.

A packet including an address indicating that the packet be sent to sub CPU 140 in the first powder saving state represents one example of a packet of a first type.

In the second power saving state, when a packet received by wireless LAN module 160 includes an IP address and a MAC address for ARP response, CPU 161 gives ARP response. When the packet received by wireless LAN module 160 includes an IP address and a MAC address for ECHO response, CPU 161 gives ECHO response.

A packet including an address for ARP response in the second power saving state represents one example of a packet of a second type. A packet including an address for ECHO response represents another example of the packet of the second type.

When a packet received by wireless LAN module 160 is a packet for WoL, CPU 161 performs processing for launching sub CPU 140 by transmitting a signal to the GPIO of sub CPU 140 by using the WoL function. In this case, wireless LAN module 160 can also launch sub CPU 140 by outputting a Remote Wakeup signal on the USB.

A packet for WoL represents one example of a packet of a third type.

When an address of a packet received by wireless LAN module 160 is a broadcast address or a multicast address, a protocol is designated by a port number of a user datagram protocol (UDP). Therefore, CPU 161 further detects a port number from the packet. A packet of which address is a broadcast address or a multicast address and of which post number is designated in advance represents one example of a packet for WoL. When a packet of which address is a broadcast address or a multicast address and of which port number is designated in advance is received. CPU 161 outputs to sub CPU 140, a signal for resuming supply of electric power to USB controller 170. Sub CPU 140 thus resumes power feed to sub CPU 140 and cancels the suspended state of USB controller 170. Wireless LAN module 160 and sub CPU 140 are thus connected again to each other by means of USB controller 170.

As set forth above, processing performed by CPU 161 in the first power saving state and processing performed by CPU 161 in the second power saving state are different from each other. In wireless LAN module 160, a program for processing performed by CPU 161 in the first power saving state and processing performed by CPU 161 in the second power saving state are mounted as programs different from each other. When an operating state of MFP 1 is the first power saving state, CPU 161 executes a program for the first power saving state. When an operating state of MFP 1 is the second power saving state, the CPU executes a program for the second power saving state.

By using programs different from each other between the first power saving state and the second power saving state, sizes of both programs can be minimized. As CPU 161 switches a program to be used between the first power saving state and the second power saving state, a size of a RAM mounted on wireless LAN module 160 can be suppressed and power consumption in wireless LAN module 160 in each state can be reduced. Thus, electric power consumed by MFP 1 in the second power saving state can be reduced, for example, to approximately 0.5 W or lower defined in a directive on eco-design of energy-related products (ErP).

[3. Flow of Processing]

Figure 3:
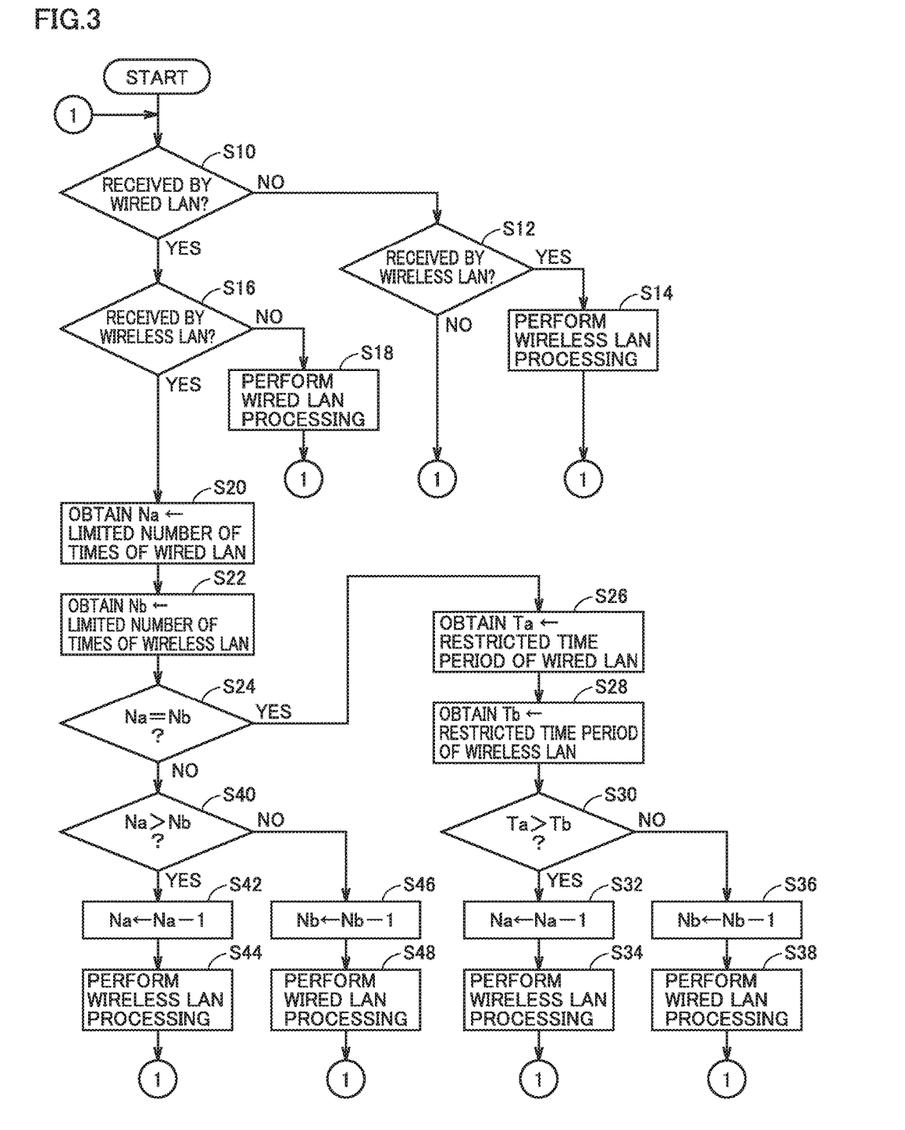
FIG. 3 is a flowchart of processing performed for processing a packet in a first power saving state.

FIG. 3 is a flowchart of processing performed by sub CPU 140 for processing a packet in the first power saving state.

As shown in FIG. 3, when an operating state of MFP 1 makes transition to the first power saving state, in step S10, sub CPU 140 determines whether or not wired LAN module 150 has received a packet. "Wired LAN module 150 having received a Packet" means, for example, that wired LAN module 150 has decided to allow passage of the packet to sub CPU 140 based on an address of the packet received by wired LAN module 150.

When sub CPU 140 determines that a packet has been received from wired LAN module 150 (YES in step S10), control proceeds to step S16. When sub CPU 140 determines that a packet has not been received from wired LAN module 150 (NO in step S10), control proceeds to step S12.

In step S12, sub CPU 140 determines whether or not a packet has been received from wireless LAN module 160. "Wireless LAN module 160 having received a packet" means, for example, that wireless LAN module 160 has decided to allow passage of the packet to sub CPU 140 based on an address of the packet received by wireless LAN module 160.

When sub CPU 140 determines that a packet has been received from wireless LAN module 160 (YES in step S12), control proceeds to step S14. When sub CPU 140 determines that a packet has not been received from wireless LAN module 160 (NO in step S12), control returns to step S10.

In step S14, sub CPU 140 processes the packet of the wireless LAN (input from wireless LAN module 160). In step S14, sub CPU 140 performs processing such as proxy response or launch of main CPU 100 by processing the packet of the wireless LAN, for example, by using a set of addresses for the wireless LAN stored in storage Device 200 in advance. Thereafter, control returns to step S10.

In step S16, sub CPU 140 determines whether or not a packet has been Received from wireless LAN module 160 as in step S12. When the sub CPU Determines that a packet has been received from wireless LAN module 160 (YES in Step S16), control proceeds to step S20. When the sub CPU determines that a packet Has not been received from wireless LAN module 160 (NO in step S16), control proceeds to step S18.

In step S18, sub CPU 140 processes a packet of the wired LAN (input from wired LAN module 150). In step S18, sub CPU 140 performs processing such as proxy response or launch of main CPU 100 by processing the packet of the wired. LAN, for example, by using a set of addresses for the wired LAN stored in storage device 200 in advance. Thereafter, control returns to step S10.

In step S20, sub CPU 140 obtains the limited number of times Na of transmission of the packet from the packet input from wired LAN module 150. Thereafter, control proceeds to step S22.

The "limited number of times Na" refers to the number of times representing the limit up to which the packet can be resent. In a network to which MFP 1 is connected, a device which has transmitted a packet waits for an Ack signal from a device which has received the packet for a certain period after transmission of the packet. When the device cannot receive the Ack signal, the packet is resent. When an Ack signal cannot be received in spite of resending of the packet the number of times specified by the limited number of times Na, transmission of the packet is determined as failure.

In step S22, sub CPU 140 obtains the limited number of times Nb of transmission of the packet from the packet input from wireless LAN module 160. Thereafter, control proceeds to step S24.

In step S24, sub CPU 140 determines whether or not the limited number of times Na obtained in step S20 is equal to the limited number of times Nb obtained in step S20. When sub CPU 140 determines dun the limited number of times Na is equal to the limited number of times Nb (YES in S24), control proceeds to step S26. When sub CPU 140 determines that the limited number of times Na is different from the limited number of times Nb (NO in step S24), control proceeds to step S40.

In step S26, sub CPU 140 obtains a remaining time period Ta until discarding of the packet front the packet input from wired LAN module 150. Thereafter, the control proceeds to step S28.

In step S28, sub CPU 140 obtains a remaining time period Tb until discarding of the packet from the packet input from wireless LAN module 160. Thereafter, control proceeds to step S30.

In step S30, sub CPU 140 determines whether or not remaining time period Ta is longer than remaining time period Tb. When sub CPU 140 determines that remaining time period Ta is longer than remaining time period Tb (YES in step S30), control proceeds to step S32. When sub CPU 140 determines that remaining time period Ta is equal to or shorter than remaining time period Tb (NO in step S30), control proceeds to step S36.

In sub S32, sub CPU 140 decrements by one a value for the limited number of times Na tor the packet received by wired LAN module 150 and thereafter control proceeds to step S34.

In step S34, sub CPU 140 processes the packet received by wireless LAN module 160 as in step S14. Thereafter, control returns to step S10.

In step S36, sub CPU 140 decrements by one a value for the limited number of times Nb for the packet received by wireless LAN module 160 and thereafter control proceeds to step S38.

In step S38, sub CPU 140 processes the packet received by wired LAN module 150 as in step S18. Thereafter, control returns to step S10.

Is step S40, sub CPU 140 determines whether or not the limited number of times Na is greater than the limited number of times Nb. When sub CPU 140 determines that the limited number of times Na is greater than the limited number of times Nb (YES in step S40), control proceeds to step S42. When sub CPU 140 determines that the limited number of times Na is equal to or smaller than the limited number of times Nb (NO in step S40), control proceeds to step S46.

In step S42, sub CPU 140 decrements by one a value for the limited, number of times Na for the packet received by wired LAN module 150 and thereafter control proceeds to step S44.

In step S44, sub CPU 140 processes the packet received by wireless LAN module 160 as in step S14. Thereafter, control returns to step S10.

In step S46, sub CPU 140 decrements by one the value for the limited number of times Nb for the packet received by wireless LAN module 160 and thereafter control proceeds to step S48.

In step S48, sub CPU 140 processes the packet received by wired LAN module 150 as in step S18. Thereafter, control returns to step S10.

In the processing in FIG. 3 described above, when a packet received by wireless LAN module 160 is processed in step S14, sub CPU 140 uses a combination of a MAC address and an IP address to be used by wireless LAN module 160. When a packet received by wired LAN module 150 is processed in step S18, sub CPU 140 uses a combination of a MAC address and an IP address to be used by wired LAN module 150.

Sub CPU 140 processes both of a packet received by wired LAN module 150 and a packet received by wireless LAN module 160. Thus, electric power consumed by MFP 1 in the first power saving state can be reduced, for example, to approximately 1.0 W or lower defined in the ErP directive.

Sub CPU 140 can process a packet received by wired LAN module 150 and a packet received by wireless LAN module 160. Thus, the packets simultaneously received by wired LAN module 150 and wireless LAN module 160 may be targets of processing by sub CPU 140. In such a case, sub CPU 140 processes a packet smaller in remaining number of opportunities (Na, Nb) for resending of the packet, of the packet received by wired LAN module 150 and the packet received by wireless LAN module 100. When, the remaining number of opportunities for resending is the same, a packet shorter in remaining time period (Ta, Tb) until discarding of the packet is processed.

[4. Modification of Controller]

Figure 4:
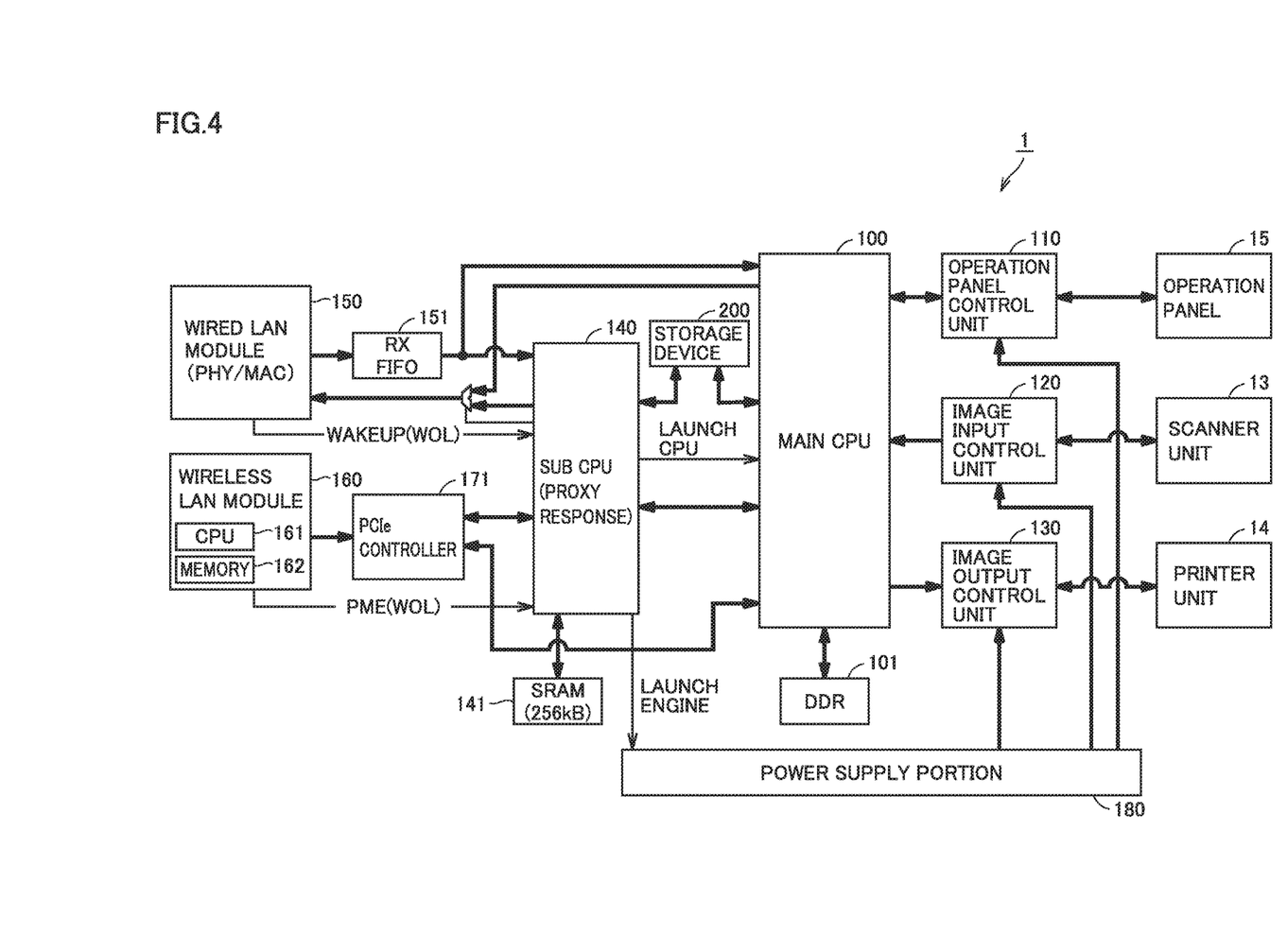
FIG. 4 is a diagram showing a modification of the hardware configuration of the MFP.

FIG. 4 is a diagram showing a modification of the hardwire configuration of MFP 1. MFP 1 shown in FIG. 4 includes a PCI express (PCIe) controller 171 instead of USB controller 170 in FIG. 2. USB controller 170 has a USB interface, whereas PCIe controller 171 has a PCIe interface. In MFP 1 shown in FIG. 4, wireless LAN module 160 communicates with main CPU 100 and sub CPU 140 by means of PCIe controller 171.

In the second power saving state of MFP 1, PCIe controller 171 is in an L2 state in which power consumption is lowest. When MFP 1 recovers from the second power saving state to the first power saving state, wireless LAN module 160 has PCIe controller 171 recover from the L2 state to an L0 state (normal state) by using a power management event (PME) signal.

According to one embodiment, a sub processor can process both of a packet received by the wired LAN module and a packet received by the wireless LAN module in the power saving state in which supply of electric power to the main processor is stopped. Thus, an image processing apparatus can process both of the packet received by the wired LAN module and the packet received by the wireless LAN module simply by supplying electric power to the sub processor in the power saving state. Therefore, as compared with an example in which electric power is supplied to a plurality of sub processors in the first power saving state, power consumption in the power saving state of the image processing apparatus can be reduced.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus comprising:
  a wired local area network (LAN) hardware module configured to be connected to a wired LAN by using a first combination of a media access control (MAC) address and an Internet protocol (IP) address;
  a wireless LAN hardware module configured to be connected to a wireless LAN by using a second combination of a MAC address and an IP address, the second combination being different from the first combination;
  a main processor configured to process packets received by the wired LAN hardware module and the wireless LAN hardware module in a normal state of the image processing apparatus; and
  a sub processor configured to process a packet received by the wired LAN hardware module and process a packet received by the wireless LAN hardware module in place of the main processor in a first power saving state of the image processing apparatus in which supply of electric power to the main processor is stopped,
  the sub processor being configured to process the packets received by the wired LAN hardware module by using the first combination and to process the packets received by the wireless LAN hardware module by using the second combination in the first power saving state,
  wherein the sub processor is configured to have the image processing apparatus make transition from the first power saving state to a second power saving state by stopping supply of electric power to the sub processor,
  and wherein the wireless LAN hardware module includes a module processor configured to: (1) in the first power saving state, allow, when a packet of a first type is received by the wireless LAN, passage of the packet of the first type to the sub processor; and (2) in the second power saving state, provide, when a packet of a second type is received by the wireless LAN, a response corresponding to the second type, and perform processing for resuming supply of electric power to the sub processor when a packet of a third type is received by the wireless LAN.

2. The image processing apparatus according to claim 1, wherein
  the sub processor is configured to process, when the wired LAN hardware module receives a packet simultaneously with reception of a packet by the wireless LAN hardware module, the packet smaller in number of remaining opportunities for resending included in the packet.

3. The image processing apparatus according to claim 2, wherein
  the sub processor is configured to process, when the wired LAN hardware module receives a packet simultaneously with reception of a packet by the wireless LAN hardware module and when the packet received by the wired LAN hardware module and the packet received by the wireless LAN hardware module are equal to each other in remaining number of opportunities for resending, the packet shorter in remaining time period until discarding of the packet.

4. The image processing apparatus according to claim 1, wherein
  the wireless LAN hardware module further includes a memory,
  the memory stores a first program and a second program executed by the module processor, and
  the module processor is configured to
   in the first power saving state, allow, when the packet of the first type is received by the wireless LAN, passage of the packet of the first type to the sub processor by executing the first program, and in the second power saving state, provide, when the packet of the second type is received by the wireless LAN, the response corresponding to the second type by executing the second program, and perform processing for resuming supply of electric power to the sub processor when the packet of the third type is received by the wireless LAN by executing the second program.

5. The image processing apparatus according to claim 4, the image processing apparatus further comprising a controller configured to control data transmission between the wireless LAN hardware module and the sub processor, wherein
the sub processor has the controller make transition to a suspended state when the wired LAN hardware module and the wireless LAN hardware module have not received a packet continuously for a predetermined time period in the first power saving state or after the packet received by the wired LAN hardware module or the wireless LAN hardware module is processed in the first power saving state, and
the wireless LAN hardware module is configured to perform processing for canceling the suspended state of the controller when the wireless LAN hardware module receives the packet of the third type while the controller is in the suspended state.

6. The image processing apparatus according to claim 5, wherein the controller is a universal serial bus (USB) controller.

7. The image processing apparatus according to claim 5, wherein the controller is a peripheral component interconnect express (PCIe) controller.

8. A method of controlling an image processing apparatus, the image processing apparatus including a main processor, a sub processor, a wired LAN hardware module, and a wireless LAN hardware module, the method comprising:
the sub processor processing a packet received by the wired LAN hardware module by using a first combination of a media access control (MAC) address and an Internet protocol (IP) address in a power saving state in which supply of electric power to the main processor is stopped;
the sub processor processing a packet received by the wireless LAN hardware module by using a second combination of a MAC address and an IP address in the power saving state, the second combination being different from the first combination; and
the sub processor causing the image processing apparatus to make transition from the power saving state to another power saving state by stopping supply of electric power to the sub processor,
wherein the wireless LAN hardware module includes a module processor, and the non-transitory recording medium stores a first module processor program and a second module processor program,
wherein the first module processor program causes the module processor to, in the power saving state, allow, when a packet of a first type is received by the wireless LAN, passage of the packet of the first type to the sub processor, and
and wherein the second module processor program causes the module processor to, in the another power saving state, provide, when a packet of a second type is received by the wireless LAN, a response corresponding to the second type, and perform processing for resuming supply of electric power to the sub processor when a packet of a third type is received by the wireless LAN.

9. A non-transitory recording medium storing a computer readable program for controlling an image processing apparatus, the image processing apparatus including a main processor, a sub processor, a wired LAN hardware module, and a wireless LAN hardware module, the program causing the sub processor to perform:
processing a packet received by the wired LAN hardware module by using a first combination of a media access control (MAC) address and an Internet protocol (IP) address in a power saving state in which supply of electric power to the main processor is stopped;
processing a packet received by the wireless LAN hardware module by using a second combination of a MAC address and an IP address in the power saving state, the second combination being different from the first combination; and
causing the image processing apparatus to make transition from the power saving state to another power saving state by stopping supply of electric power to the sub processor,
wherein the wireless LAN hardware module includes a module processor, and the non-transitory recording medium stores a first module processor program and a second module processor program,
wherein the first module processor program causes the module processor to, in the power saving state, allow, when a packet of a first type is received by the wireless LAN, passage of the packet of the first type to the sub processor,
and wherein the second module processor program causes the module processor to, in the another power saving state, provide, when a packet of a second type is received by the wireless LAN, a response corresponding to the second type, and perform processing for resuming supply of electric power to the sub processor when a packet of a third type is received by the wireless LAN.

10. The image processing apparatus according to claim 1, wherein the wired LAN hardware module includes a network card and the wireless LAN hardware module includes a wireless LAN adapter.

11. The method according to claim 8, wherein the wired LAN hardware module includes a network card and the wireless LAN hardware module includes a wireless LAN adapter.

12. The non-transitory recording medium according to claim 9, wherein the wired LAN hardware module includes a network card and the wireless LAN hardware module includes a wireless LAN adapter.

* * * * *